US007076380B2

(12) United States Patent
Michel

(10) Patent No.: US 7,076,380 B2
(45) Date of Patent: Jul. 11, 2006

(54) METHOD AND CIRCUIT FOR REAL TIME FREQUENCY ANALYSIS OF A NON-STATIONARY SIGNAL

(75) Inventor: Patrice Michel, Merville (FR)

(73) Assignee: Airbus France (FR)

( * ) Notice: Subject to any disclaimer, the term of this patent is extended or adjusted under 35 U.S.C. 154(b) by 145 days.

(21) Appl. No.: 10/482,499

(22) PCT Filed: Jul. 2, 2002

(86) PCT No.: PCT/FR02/02300

§ 371 (c)(1),
(2), (4) Date: Dec. 31, 2003

(87) PCT Pub. No.: WO03/005229

PCT Pub. Date: Jan. 16, 2003

(65) Prior Publication Data

US 2004/0189277 A1    Sep. 30, 2004

(30) Foreign Application Priority Data

Jul. 4, 2001    (FR) .................................. 01 08872

(51) Int. Cl.
G01R 23/00    (2006.01)
G06F 19/00    (2006.01)

(52) U.S. Cl. ....................................................... 702/75
(58) Field of Classification Search .................. 702/17, 702/66, 70, 71, 75–77, 79, 190, 194, 196, 702/197; 704/205; 708/311, 312, 314, 403, 708/404, 405; 324/76.39, 76.41, 76.42, 76.44, 324/76.45

See application file for complete search history.

(56) References Cited

U.S. PATENT DOCUMENTS 4,941,178 A  *   7/1990  Chuang ...................... 704/252
5,751,899 A  *   5/1998  Large et al. ................. 704/207

OTHER PUBLICATIONS

Zhiyue Lin et al., "*Advances in Time-Frequency Analysis of Biomedical Signals*", Critical Reviews in Biomedical Engineering, vol. 24, no. 1, 1996, pp. 1-72.

D.W. Skagen, "*Estimation of Running Frequency Spectra Using a Kalman Filter Algorithm*", Journal of Biomedical Engineering, May 1988, UK, vol. 10, No. 3, pp. 275-279.

(Continued)

Primary Examiner—Michael Nghiem
(74) Attorney, Agent, or Firm—Thelen Reid & Priest LLP

(57) ABSTRACT

Method for analysing the frequency in real-time of a non-stationary signal and corresponding analysis circuit.

According to the invention, the signal is sampled, it is digitised, it is broken up into sub-bands. In each sub-band, the signal is modelled by an auto-regressive filter the transfer function of which is of the form $1/A(z)$. By an adaptive method that is recursive in time and in order, all the polynomials $A(z)$ that have a degree between 1 and a maximum value are calculated. The order of the model is estimated and the polynomial that has this order is retained. The roots of this polynomial are calculated and the components are monitored. The frequency and the amplitude of the sinusoidal components of the signal are thus obtained.

Application in aeronautics, electromagnetic, mechanics, seismic prospecting, zoology, etc.

11 Claims, 8 Drawing Sheets

OTHER PUBLICATIONS

J. Pardey et al., "*A Review of Paramedic Modelling Techniques for EEG Analysis*", Medical Engineering & Physics, vol. 18, No. 1, 1996, pp. 2-11.

International Search Report, PCT/FR 02/02300, International filing date Jul. 2, 2002, date Search Report mailed Oct. 2, 2003.

* cited by examiner

METHOD AND CIRCUIT FOR REAL TIME FREQUENCY ANALYSIS OF A NON-STATIONARY SIGNAL

CROSS-REFERENCE TO RELATED APPLICATIONS

This application claims priority based on International Patent Application No. PCT/FR02/02300, entitled "Method for Analysing the Frequency in Real Time of a Non-Stationary Signal and Corresponding Analysis Circuit" by Patrice Michel, which claims priority of French application no. 01 08872, filed on Jul. 4, 2001, and which was not published in English.

TECHNICAL FIELD

The subject of the present invention is a method for analysing the frequency in real-time of a non-stationary signal and the corresponding analysis circuit. By "real-time" analysis is understood as analysis where each piece of information is processed before the next one appears. This constraint is much tighter than in the normal practice where "real-time" analysis means that the information is processed without recording and subsequent evaluation but in time limits that are not nil.

The invention finds an application in aeronautics (study and control of structures in flight), in electrodynamics (control of electricity generating machines), in mechanics (study and control of moving parts), in car industry (control of vibrations in vehicles), in seismic prospecting (study of signals used in oil prospecting), in zoology (study of sounds given out by animals), etc.

PRIOR ART

The signal that it is required to analyse is composed of a noise to which are added one or more sinusoidal signals, the frequencies and amplitudes of which are able to vary over time. These frequencies and these amplitudes are measured in real-time. An analysis of this kind is sometimes termed "time-frequency".

Many spectrum analysis methods are known, the most celebrated being no doubt the Fourier analysis. Although this analysis does give the signal spectrum, it applies essentially to signals that are stationary or varying slowly in time. It is not therefore suitable, in general, for a real-time analysis.

The method consisting in limiting the signal in a sliding window (a Gaussian window for example as proposed by GABON), makes it possible to obtain a time-frequency representation, but the accuracy of the localisation of each frequency in time is still insufficient. It has to form the subject of a compromise, since uncertainty over the localisation in frequency and uncertainty over the localisation in time are connected (the so-called HEISENBERG-GABON uncertainty principle).

Wavelet transform is also widely known. This is an analysis tool offering a good compromise between frequency localisation and time localisation. But it is more a matter of a time scale analysis than a time-frequency analysis. Additionally, it comes up against a problem of making the wavelet and the frequency suitable for use.

There are in fact very few methods for analysing non-stationary signals in real-time. The reason for this is no doubt that the need is not so frequent since, in the vast majority of cases, the signal for analysis can be recorded and studied subsequently as one wishes. Furthermore, although real-time analysis methods do exist, they are laboratory methods, where constraints related, for example, to built-in hardware, cost reduction, ease of implementation, etc., do not exist.

Indeed the purpose of the present invention is to overcome this shortcoming by proposing an analysis method that is specially adapted to constraints of this kind.

DISCLOSURE OF THE INVENTION

To this end, the invention proposes a particular combination of processes that meets this need.

More exactly, the subject of the present invention is a method for analysing the frequency in real-time of a non-stationary signal, characterised in that it includes the following operations:

A) the signal is sampled at a frequency (fee) at least equal to twice the highest expected frequency and the samples obtained are digitised, B) the sampled and digitised signal is broken up into sub-bands by applying the samples to a bank of digital filters with adjacent pass bands, C) the signal is modelled in each sub-band by an auto-regressive filter, the transfer function of which is $1/A(z)$, where $A(z)$ is a polynomial of the complex variable $z=\exp(j2\pi f/fee)$ by implementing an adaptive method that is recursive in time and in order, all the polynomials $A(z)$ with a degree between 1 and a maximum value selected in advance are calculated, D) the order of the model is estimated and of all the calculated polynomials the one retained is the one having this order, E) using a recursive algorithm, at least some complex roots of the polynomial selected are calculated, F) from the phase of the roots obtained, the corresponding frequencies are determined, the sinusoidal components are monitored by calculating, in a frequency-amplitude plane, the square of the distance separating a current point corresponding to a component at one sampling instant from the points obtained at the previous sampling instant, the previous point which minimises this square is made to correspond to the current point and the different points are connected by minimising a weighted function of these squares; and from the frequencies, the amplitudes are sought for the sinusoidal components that have these frequencies and which minimise the quadratic error between the sum of these components and the signal for analysis. The amplitude of the various sinusoidal components of the signal in the sub-band processed are therefore obtained.

To advantage, after breaking up the sampled and digitised signal into sub-bands, each sub-band is spread in frequency before modelling.

Another subject of the invention is an analysis circuit implementing the process which has just been described.

DETAILED DESCRIPTION OF PARTICULAR EMBODIMENTS

Figure 1A:
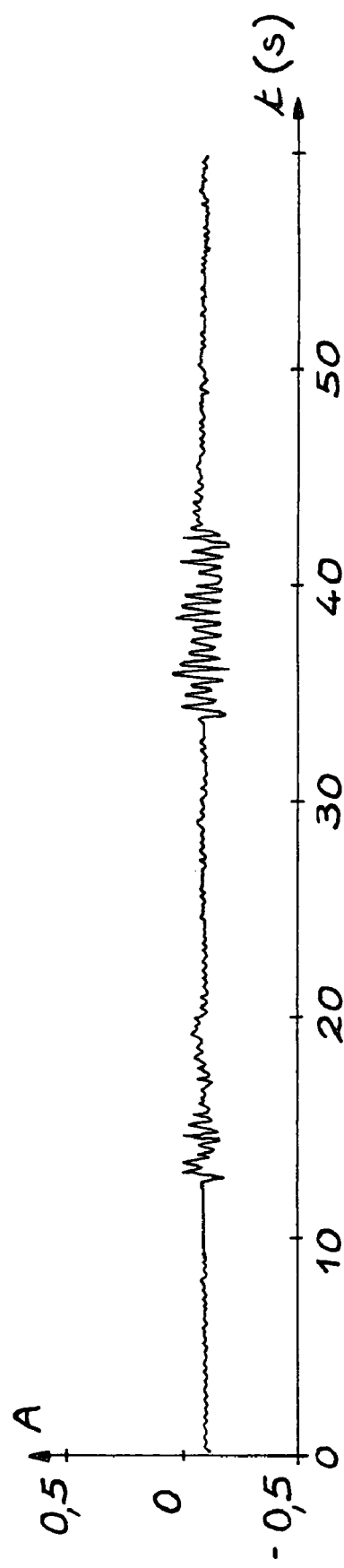
FIGS. 1A, 1B show two examples of non-stationary signals for real-time analysis.
Figure 1B:
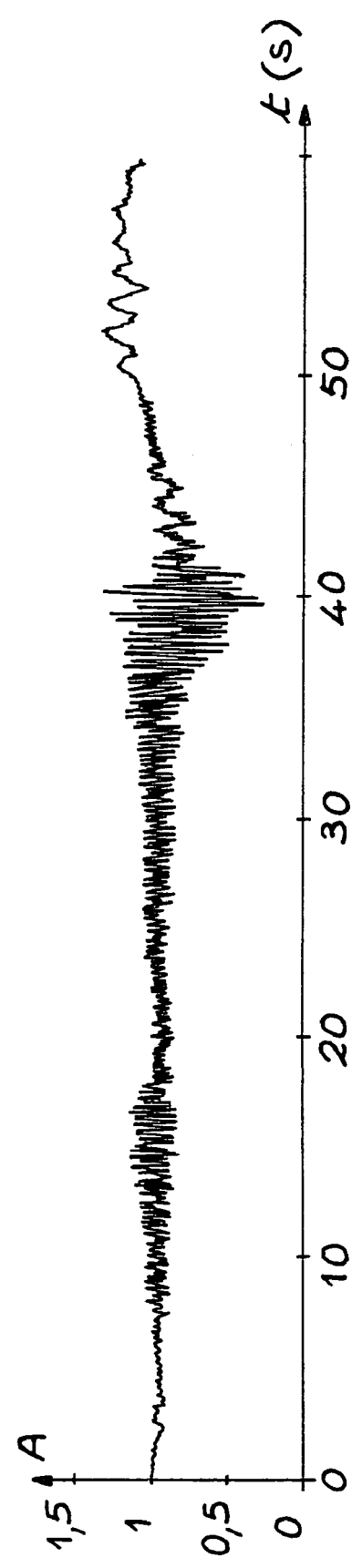

The signals for analysis may be of very diverse natures and origins. In FIGS. 1A and 1B can be seen two examples of such signals, which extend over some 50 seconds, and which correspond to signals measured on A340 aeroplane structures in flight.

This type of signal can be analysed in real-time according to the invention by employing already specified operations.

(A) Sampling and Digitisation

The analysis method of the invention includes a first operation which is a sampling and a digitisation of the samples. If the band occupied a priori by the signal extends from 0 to a value fm, in other words if the highest expected frequency is equal to fm, the signal is sampled at a frequency fe equal to 2 fm, in accordance with SHANON'S theorem. Each sample is then digitised and, at each sampling instant tn, is thus obtained a digital sample $s_n$, in the knowledge that at that instant previous samples $s_{n-1}$, $s_{n-2}$, etc. are available which have been memorised, where the sampling interval $t_i - t_{i-1}$ is equal to $1/f_e$.

(B) Breaking Up Into Sub-bands

The second operation consists in filtering the signal. This filtering aims to break up the spectrum into sub-bands. To do this, the sampled and digitised signal is applied to a bank of digital filters the pass bands of which are adjacent and the re-combination of which reconstitutes the whole band from 0 to fm. To advantage, all the sub-bands have the same width.

The filters used may be either finite impulse response (FIR) filters (in other words with compact support), or infinite impulse response (UIR) filters (with non compact support).

It will be recalled that a finite impulse response (FIR) digital filter is a linear system defined by a recurrent equation according to which an output number, representing a sample of the filtered signal, is obtained by weighted summation of a finite set of input numbers, representing the samples of the signal for filtering. The coefficients of the weighted summation constitute the impulse response of the filter.

An infinite impulse response (UIR) digital filter is a linear system defined by an equation revolving around an infinity of terms. Each element in the sequence of output numbers is calculated by weighted summation of a certain number of elements in the input sequence and a certain number of previous output sequence elements.

These filters may be defined by their transfer function denoted H(z) where z is a complex variable equal to $\exp(j2\pi \bar{f})$ where $\bar{f}$ is the reduced frequency equal to f/fe where fe is the sampling frequency.

The transfer function of a finite impulse response filter has the form:

$$H(Z) = \sum_{i=0}^{N-1} a_i z^{-i}, \tag{1}$$

and that of an infinite impulse response filter has the form:

$$H(Z) = \frac{\sum_{l=0}^{L} b_l z^{-l}}{1 + \sum_{k=1}^{K} a_k z^{-k}}, \tag{2}$$

or again $$H(z) = \frac{B(z)}{A(z)}.$$

The zeros of the polynomial A(z) are the poles of the transfer function.

A large number of FIR filters can be used in the invention and particularly the filters encountered in wavelet analysis.

B.1. Breaking Up Through FIR Filters.

This breaking up uses, for example, a low-pass filter, denoted H, associated with a scale function $\phi$ and a high-pass filter G associated with the wavelet $\psi$. The two filters complement each other and form so-called "quadrature mirror" filters (or QMF in its abbreviated form).

Figure 2:
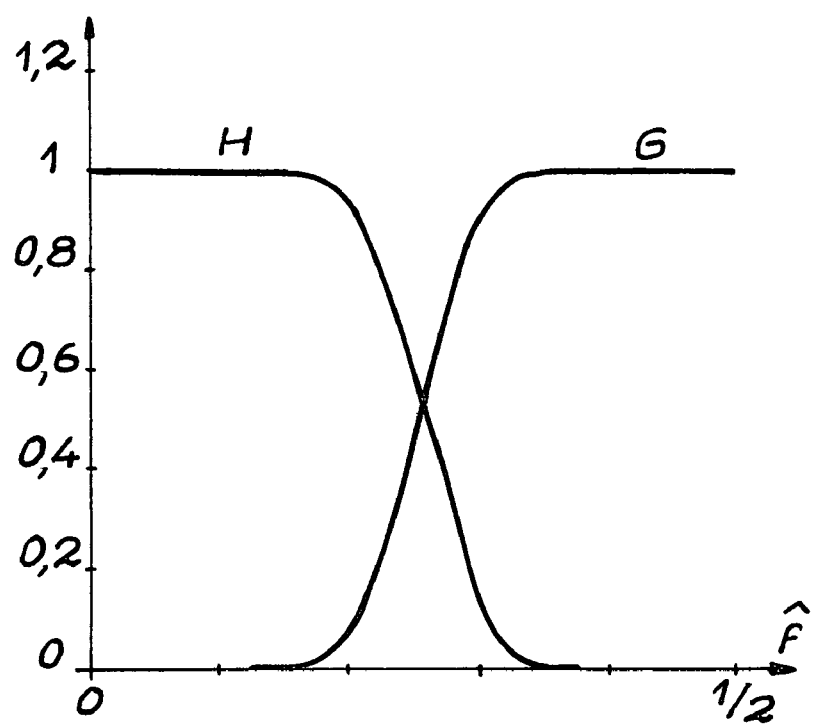
FIG. 2 shows two frequency responses of finite impulse response filters in quadrature.

The appended FIG. 2 shows an example of frequency response of quadrature mirror filters of the DAUBECHIES type with 20 coefficients. The x-axis extends from 0 to fe/2, in other words from 0 to ½ in reduced frequency $\bar{f}$. The ordinate represents the filter gain.

In this case, the transfer function H(z) is written:

$$H(z) = \sum_{n=0}^{19} h_n z^n$$

with 20 coefficients hn given in table 1.

TABLE 1

$h_0 = 0.0266700579005473$
$h_1 = 0.1881768000776347$
$h_2 = 0.5272011889315757$
$h_3 = 0.6884590394534363$
$h_4 = 0.2811723436605715$
$h_5 = -0.2498464243271598$
$h_6 = -0.1959462743772862$
$h_7 = 0.1273693403357541$
$h_8 = 0.0930573646035547$
$h_9 = -0.0713941471663501$
$h_{10} = -0.0294575368218399$
$h_{11} = 0.0332126740593612$

TABLE 1-continued $h_{12} = 0.0036065535669870$
$h_{13} = -0.0107331754833007$
$h_{14} = 0.0013953517470688$
$h_{15} = 0.0019924052951925$
$h_{16} = -0.0006858566949564$
$h_{17} = -0.0001164668551285$
$h_{18} = 0.0000935886703202$
$h_{19} = -0.0000132642028945$ The coefficients $g_n$ of the additional filter G are obtained from the coefficients $h_n$ by the relation:

$$g_n = (-1)^n h_{1-n} \quad (3)$$

B.2. Breaking Up Through IIR Filters

Although finite impulse response filters are worthwhile, they nonetheless have a drawback related to the overlapping of the two adjacent sub-bands. This overlapping creates a "blind" zone where the estimation of a component falling into this zone becomes difficult.

It may therefore be preferable to use infinite impulse response filters (with non-compact support) which allow a cleaner cut to be obtained.

By way of example, a choice may be made between:

i) for one of the filters, H, a transfer function of the type of that in the relation (2) where the numerator is a ten coefficient polynomial given in table II and where the denominator is a 9 coefficient polynomial given in table III.

| TABLE II<br>Numerator H | TABLE III<br>Denominator H |
| --- | --- |
| -0.5 | -122.517147003135 |
| -2.43816568111942 | 0 |
| -20.5029786833857 | -146.958674436377 |
| -53.3805738812567 | 0 |
| -79.1939879946774 | -39.786961563896 |
| -79.1939879946774 | 0 |
| -53.3805738812567 | -0.808430692907934 |
| -20.5029786833857 | 0 |
| -2.43816568111942 | 0.039801215434065 |
| 0.5 | | ii) for the other filter, G, a transfer function will be selected where the numerator is a polynomial also with ten coefficients (given in table IV) and where the denominator is polynomial with 9 coefficients (given in table V):

| TABLE IV<br>Numerator G | TABLE V<br>Denominator G |
| --- | --- |
| -0.5 | -122.517147003135 |
| -2.43816568111942 | 0 |
| -20.5029786833857 | -146.958674436377 |
| -53.3805738812567 | 0 |
| -79.1939879946774 | -39.786961563896 |
| -79.1939879946774 | 0 |
| -53.3805738812567 | -0.808430692907934 |
| -20.5029786833857 | 0 |
| -2.43816568111942 | 0.039801215434065 |
| 0.5 | |

Figure 3:
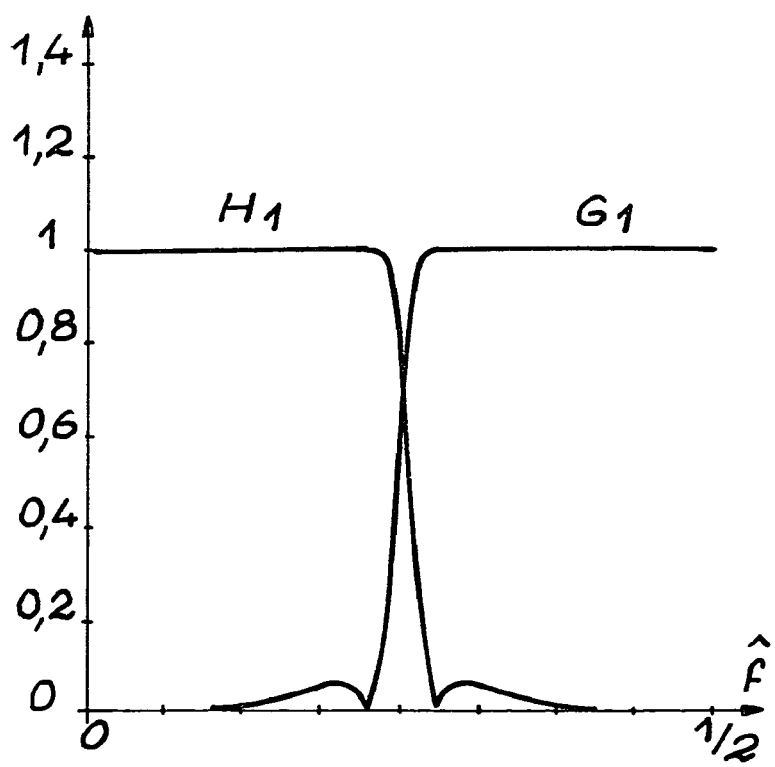
FIG. 3 shows two frequency responses of infinite impulse response filters in quadrature.

The transfer functions of these two filters $H_1$ and $G_1$ are shown in FIG. 3.

Figure 4:
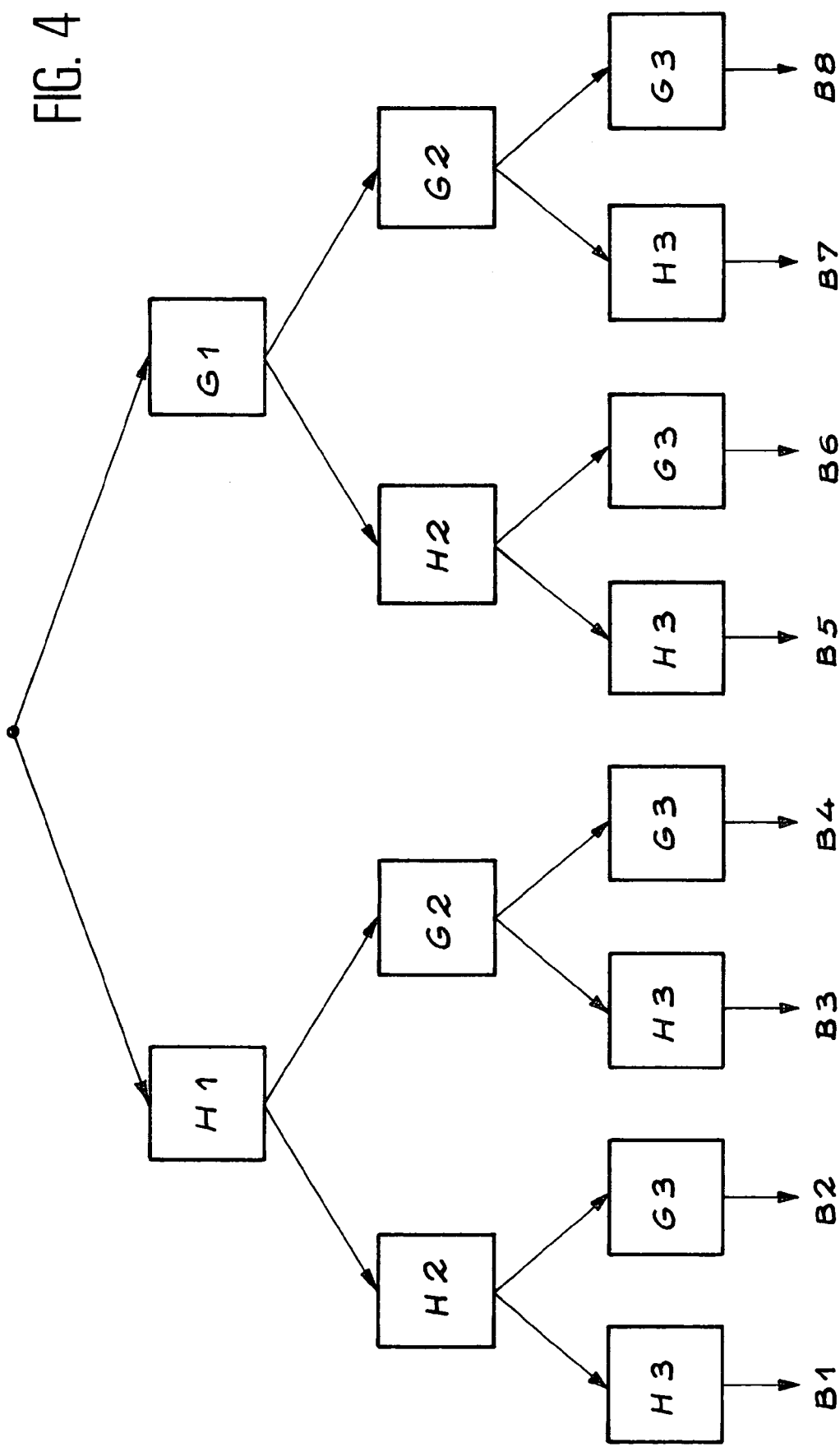
FIG. 4 shows a bank of filters for breaking up into 8 sub-bands.

An example of a cascade filter bank including three stages constituted by 2, 4 and 8 filters respectively is shown in FIG. 4. 8 sub-bands are thus obtained B1, B2, B3 to B8.

The banks of $2^k$ identical filters are quite appropriate if it is required to make the most of the breaking up coefficients. They are thereby dimensioned under the constraints of satisfying a set of equations. The choice of a bank of filters which do not have this property has the advantage of offering greater flexibility in dimensioning each of the filters (placement of the poles, gauge).

The banks of filters with $2^k$ filters are quite appropriate in the case of finite impulse response filters. For infinite impulse response filters, a single stage may be used with any number of filters, not necessarily equal to $2^k$, for example 7 filters. These filters must then, in order to be able to decimate without overlapping, be followed by HILBERT filters, which are filters whose frequency response is equal to +j for the negative frequencies and −j for the positive frequencies, which corresponds to a putting into quadrature.

Spreading the Sub-bands

In one advantageous variant of the invention, after breaking up the sampled and digitised signal into sub-bands, each sub-band is spread before the signal is modelled. Each sub-band has a width equal to fe/2 divided by the number of sub-bands, i.e. fe/2B. All the sub-bands or only some of them are spread. One may set about this by taking account of a sample on B, (an operation which, in this technique, is known as "decimation" even if B is not equal to 10). Everything happens as if the signal were being temporally compressed, in other words as if its spectrum were being stretched in the ratio B. The band is then spread between 0 and fe/2.

Figure 5:
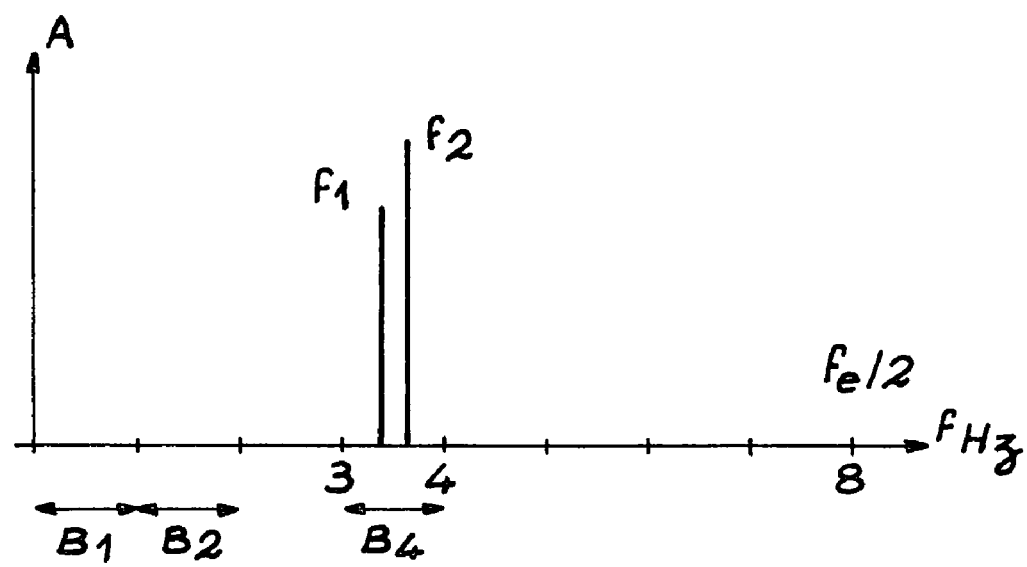
FIG. 5 shows diagrammatically the case of two sinusoidal modes of close frequencies located in the fourth sub-band.

FIG. 5 thus shows, by way of example, the case of a noiseless signal, sampled at the frequency fe=16 Hz and broken up into B=8 bands. Each sub-band has a width of 1 Hz and the set is spread between 0 and 8 Hz. This signal is presumed to contain two sinusoidal components at frequencies $f_1$ and $f_2$ located within the fourth sub-band B4. We have for example $f_1$=3.5 Hz and $f_2$=3.6 Hz.

Figure 6:
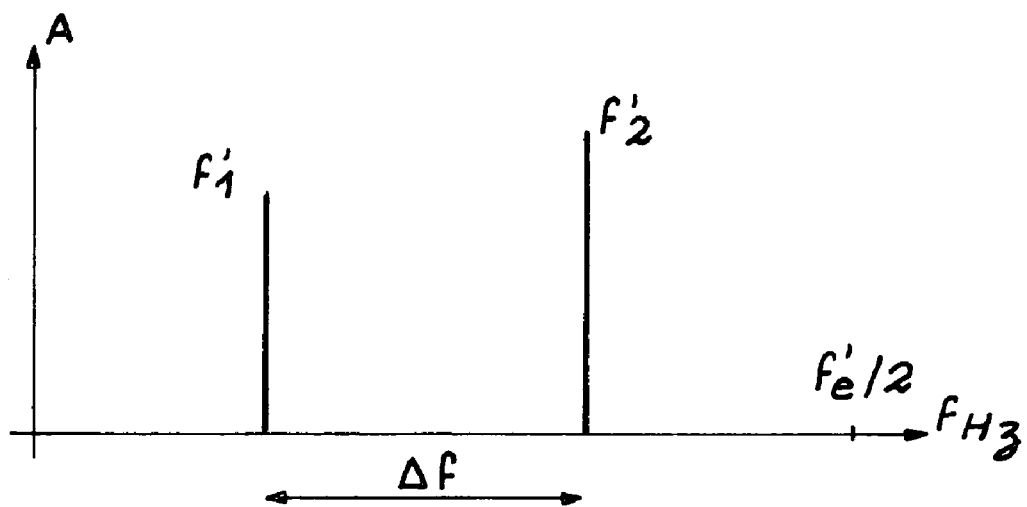
FIG. 6 shows the effect of the spread of the fourth sub-band.

These two frequencies $f_1$ and $f_2$ are $\Delta f$=0.1 Hz apart. Since $\Delta f$ is small in front of the sampling frequency $f_e$, it is difficult to distinguish them (especially if the noise level is relatively high). Only one sample in eight is then taken. It is therefore as if we were sampling at the frequency $f_0/8$=2 Hz =$f'_e$. A maximum spectral frequency is then obtained of 1 Hz. Hence the new signal shown in FIG. 6 whose spectrum spreads from 0 to 1 Hz.

The frequencies $f'_1$ and $f'_2$ are different from $f_1$ and $f_2$ but $f_1$ and $f_2$ can be recovered from $f'_1$ and $f'_2$ because the frequency band from which they have come is known. Analysing this new signal is much easier because $f'_1$ and $f'_2$ are still distant by $\Delta f$ but now $\Delta f$ is no longer small in front of $f'_e$.

C) Modelling

Signal modelling is a problem which plays a major part in signal processing. Among all the known techniques, the so-called parametric models seem fully adapted to the constraints encountered in the present invention. Parametric modelling consists in associating with a signal a set of parameters constituting what is called a "parameter vector". This vector characterises the signal as best it can in the sense of a certain error criterion. This type of model has a number of advantages: first of all it is known how to extract some information from it so as to obtain, for example, a spectrum analysis. Then, algorithms are known that are recursive in time and order which make it possible to estimate the model parameters in real-time. Lastly, the representation space can be reduced by representing a set of N samples by a vector of dimension p much less than N.

A linear system may be modelled by a transfer function IIR filter:

$$H(z) = \frac{1}{A(z)} \quad (4)$$

where A(z) is a polynomial whose degree defines the model order. The model is called auto-regressive (or AR in abbreviated form) if the model input is a white noise.

A great many sampled signals x(n) can be represented as the output of an AR filter excited by a white noise e(n). This can be written as follows:

$$x(n) = \sum_{k=1}^{N} a(k)x(n-k) + e(n) \quad (5)$$

where e(n) is the white noise.

This type of modelling is directly linked to front-end linear prediction which, from N samples taken, makes a sample estimate x(n) correspond to the instant n by the relation:

$$\hat{x}(n) = \sum_{k=1}^{N} a_m x(n-k) \quad (6)$$

The sample x(n) appears as being composed of the predicted term x(n) and the noise e(n), unpredictable, and orthogonal to x(n) (and which is sometimes called "the innovation", in the sense that this term introduces into the established sequence of samples something new):

$$x(n) = \hat{x}(n) + e(n). \quad (7)$$

In front-end linear prediction, each sample can then be expressed by the relation:

$$x(n) = \left(\sum_{k=1}^{N} a_{(k)} x_{(n-k)}\right) + e(n) \quad (8)$$

which is, quite obviously, the relation (5) giving the output of the filter AR.

The set of coefficients a(k), which can be noted in the form of a vector with N components, i.e. $\underline{A}^N$, therefore defines the polynomial A(z) of the auto-regressive model sought. The variance of the front-end linear prediction error is given by the following relation:

$$E[e^2(n)] = E[(x(n) - \hat{x}(n))^2] = E[(x_{(n)} - \underline{x}_{n-1}^N)^t \underline{A}^N)^2] \quad (9)$$

By minimising this variance, which corresponds to a whitewashing of the error, the so-called Yule-Walker equation is obtained, the solution of which gives the vector of parameters $\underline{A}^N$.

Calculating Polynomials by an Adaptive Algorithm Recursive in Time and in Order

An adaptive approach allows a different solution to this problem. In this case, a so-called "cost" function J is specified. Generally constructed from the square of the error, it is expressed as:

$$J = \sum_{k=1}^{n} \lambda^{n-k} e_t^2$$

where $\lambda$ is a factor weighting the errors made before the instant. This so-called "forgetting" factor decreases exponentially and favours the latest acquisitions. The vector $\underline{A}^N$, which minimises this criterion, may be sought, at each instant (n).

Adaptive methods aim to optimise at each instant a vector of parameters by minimising the criterion J. They therefore have the advantage of allowing the parameters to be adapted as a function of signal changes.

The invention retains the so-called fast least-squares algorithms since they are well adapted to real-time analysis. Among these algorithms, the invention retains more particularly algorithms where a recursion is established in time and in order (and not only in time), which is well adapted to cases where the order cannot be fixed in advance. These algorithms lead to modular trellis structures, in such a way that a stage may be added to a structure without this modifying the overall system architecture.

Only the main lines will be given here of the theory of the adaptive fast least-squares algorithm and recursion formulas that allow the coefficients sought to be calculated.

The expressions used are as follows:

| | |
|---|---|
| N | Modelling order |
| $\hat{x}_n^N$ | Estimate of the sample x(n) |
| $\underline{x}_n^N$ | Vector of dimension N constructed from the last N components of the signal, $(\underline{x}_n^N)^t = (x_n, x_{n-1},$ to $x_{n-N+1})$ |
| $\underline{A}_n^N$ | Vector of front-end linear prediction (AR parameters) at the instant n, $(\underline{A}_n^N)^t = (a_{k,n}, a_{k-1,n},$ to $a_{k-N+1,n})$ |
| $\underline{B}_n^N$ | Vector of rear-end linear prediction at the instant n, $(\underline{B}_n^N)^t = (b_{k,n}, b_{k-1,n},$ to $b_{k-N+1,n})$ |
| $E_{a,n}^N$ | Power of the front-end linear prediction error |
| $E_{b,n}^N$ | Power of the rear-end linear prediction error |
| $\epsilon_{a,n}^N$ | A posteriori front-end linear prediction error |
| $\epsilon_{b,n}^N$ | A posteriori rear-end linear prediction error |
| $e_{b,n}^N$ | A priori rear-end linear prediction error |
| $e_{a,n}^N$ | A priori front-end linear prediction error |
| $k_{b,n}^N$ | Coefficients of reflection (parcor) function of the power of the rear-end prediction error |
| $k_{a,n}^N$ | Coefficients of reflection (parcor) function of the power of the front-end prediction error |
| $R_n^N$ | Matrix of correlation |
| $\underline{K}_n^N$ | Kalman gain |
| $\lambda$ | Forgetting factor |
| Delta | Positive constant |

As already explained, modelling a signal by a vector of parameters $\underline{A}^N$ (the components of which are $a_1, a_2$ to $a_N$) amounts to finding the transfer function of the form $1/A(z)$, where A(z) is a polynomial of degree N whose coefficients are $a_1, a_2$ to $a_N$. The vector $\underline{A}^N$ sought is then no other than the auto-regressive model associated with the samples $x_n$. In accordance with the relation (10), the minimised cost function is:

$$E_{a,n}^N = \sum_{k=1}^{N} \lambda^{n-k} e_k^2 = \sum_{k=1}^{N} \lambda^{n-k} [x_k - (x_{-k-1}^N)^t A_{-n}^N]^2 \quad (11)$$

where $\lambda$, a forgetting or adaptation factor, is less than unity and very much more than 0. This type of exponential weighting favours the latest acquisitions, but introduces a bias on the estimation (taking $\lambda=1$ would be a reversion to a stationary processing of the samples).

By minimising $E_{a,n}^N$, the recurrence relations being sought can be found. According to the invention, recurrence in respect of the order is decorrelated from recurrence in respect of the time. At each instant, therefore all the auto-regressive AR polynomials are estimated up to a maximum order $N_{MAX}$ fixed a priori as a function of the knowledge that one may have of the signal for analysis.

The recurrence is as follows:

a) one begins with t=1 by fixing a limit $t \leq t_{max}$ and one calculates for N=1 and $N \leq N_{MAX}$ the parameters sought from the knowledge of the order model N−1 (for N=0 the model is equal to 1); then one passes to the next order N+1=2, etc., until one reaches $N_{MAX}$; this is recurrence in order;

b) one passes then to t+1 and one repeats the calculations on the order (N=1, N=2, to $N=N_{MAX}$);

c) one repeats these operations until one reaches $t=t_{max}$.

Table VI gives the quantities which will be needed to calculate the vector $\underline{A}^N$ and table VII the relations allowing the coefficients of the AR polynomials to be calculated.

TABLE VI $t = 1$ and $t \leq n_{max}$
$N = 1$ and $N \leq N_{max}$ $E_{a,n}^{N-1} = \lambda E_{a,n-1}^{N-1} + (e_{a,n-1}^{N-1})^2 \varphi_{n-1}^{N-1}$ cumulated front-end prediction energy $E_{b,n-1}^{N-1} = \lambda E_{b,n-2}^{N-1} + (e_{a,n-1}^{N-1})^2 \varphi_{n-1}^{N-1}$ cumulated rear-end prediction energy $e_{a,n}^N = e_{a,n}^{N-1} - k_{b,n-1}^N e_{b,n}^{N-1}$ a priori front-end prediction error $e_{b,n}^N = e_{b,n-1}^{N-1} - k_{a,n-1}^N e_{a,n}^{N-1}$ a posteriori front-end prediction error $k_{a,n}^N = k_{a,n-1}^N + \varphi_{n-1}^{N-1} \frac{e_{a,n}^{N-1} e_{b,n}^N}{E_{a,n}^{N-1}}$ reflection coefficient $k_{b,n}^N = k_{b,n-1}^N + \varphi_{n-1}^{N-1} \frac{e_{b,n-1}^{N-1} e_{a,n}^N}{E_{b,n-1}^{N-1}}$ reflection coefficient $\varphi_{n-1}^N = \varphi_{n-1}^{N-1} - (\varphi_{n-1}^{N-1})^2 \frac{(e_{b,n-1}^{N-1})^2}{E_{b,n-1}^{N-1}}$ $N = N + 1$
$t = t + 1$

TABLE VII $t = 1$ and $t \leq n_{max}$
$N = 1$ and $N \leq N_{max}$ $$\underline{A}_{n+1}^{N+1} = \begin{bmatrix} \underline{A}_{n+1}^N \\ 0 \end{bmatrix} - k_{b,n+1}^{N+1} \begin{bmatrix} \underline{B}_{n+1}^N \\ -1 \end{bmatrix} + k_{b,n+1}^{N+1} e_{b,n+1}^N \begin{bmatrix} \underline{K}_{n+1}^N \\ -1 \end{bmatrix}$$

$$\underline{B}_{n+1}^{N+1} = \begin{bmatrix} 0 \\ \underline{B}_{n+1}^N \end{bmatrix} - e_{b,n+1}^N \begin{bmatrix} 0 \\ \underline{K}_{n+1}^N \end{bmatrix} - k_{a,n+1}^{N+1} \begin{bmatrix} -1 \\ \underline{A}_{n+1}^{N+1} \end{bmatrix}$$

$$\underline{K}_{n+1}^{N+1} = \begin{bmatrix} \underline{K}_{n+1}^N \\ 0 \end{bmatrix} + \varphi_{n+1}^N \frac{e_{b,n+1}^N}{E_{b,n+1}^N} \begin{bmatrix} -\underline{B}_{n+1}^N \\ 1 \end{bmatrix}$$

$N = N + 1$
$t = t + 1$

At each instant, one therefore has $(N_{MAX}-1)$ sets of coefficients defining as many as polynomials A(z). These sets can be represented in the form of a matrix as in table VII.

TABLE VIII $$\begin{pmatrix} a_0^0 & 0 & 0 & \ldots & 0 \\ a_1^0 & a_1^1 & 0 & \ldots & 0 \\ a_2^0 & a_2^1 & a_2^2 & \ldots & 0 \\ \ldots & \ldots & \ldots & \ldots & 0 \\ a_N^0 & a_N^1 & \ldots & & a_N^N \end{pmatrix} = (a_j^i)$$

The matrix is lower triangular. The N order model is:

$$A^N(z) = \sum_{j=0}^{N} a_N^j Z^{-i} = a_N^0 + a_N^1 Z^{-1} + \ldots + a_N^N Z^{-N}$$

D) Estimation of the Model Order

It is pre-supposed that the signal for analysis contains a certain number K of sinusoidal components drowned in noise. The problem is to estimate this number K. The question is not new, but has above all been tackled in respect of stationary signals. In the present invention the problem is to analyse non-stationary signals and, what is more, in real-time. The estimation method must therefore be adapted to these constraints. It will be observed that for a given structure, the model order does not change much. It only changes when a mode appears or disappears. This is not the case for the model parameters, which must be readjusted for each sample. Model order estimation is therefore specific and unconnected with the calculation of the coefficients.

The choice of model order, in other words of the number of parameters defining it, remains a tricky problem and constitutes the principal difficulty of implementing this kind of modelling. Too small a dimension leads to an irrelevant model; but too large a dimension leads to an excessive calculation load. Two different methods are provided to estimate the order, one based on a (MAP) probability criterion and the other on a law of modules.

D1. Estimation from a MAP Criterion

The non-stationary nature of the signal for analysis does not make it possible to apply the usual criteria which are based, for example, on the multiplicity of the specific values of the auto-correlation matrix, or on the so-called Akaïke criterion (AIC in abbreviated form) or others (like the MDL criterion). These criteria are asymptotic in the sense that the larger the number of samples the more probable the choice retained. The invention retains a more advantageous criterion consisting in rendering maximum an a posteriori model existence probability. This is the so-called MAP ("Maximum a Posteriori") criterion. The function to be minimised can be expressed by the following quantity:

$$\text{Log}(\hat{\sigma}_p^2) + \frac{5p}{N}\text{Log}(N) \qquad (12)$$

where $\hat{\sigma}$ is the estimated power of the noise, N is the number of samples taken into account and p is the model order.

Figure 7:
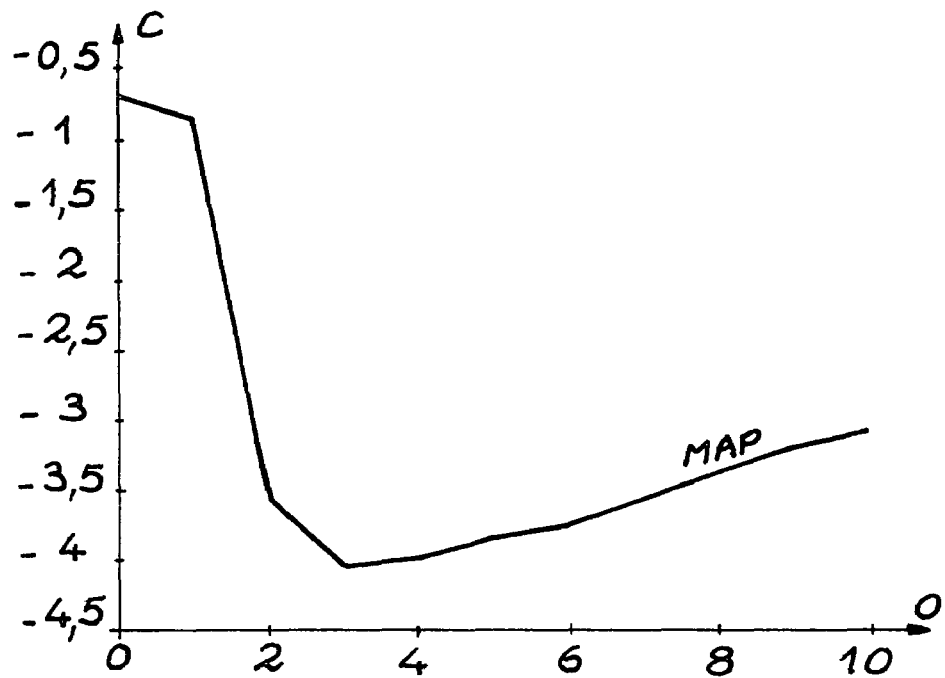
FIG. 7A shows the variations of a MAP criterion allowing the order of the model to be estimated and FIG. 7B the variations of two other criteria (AIC, MDL)
Figure 7:
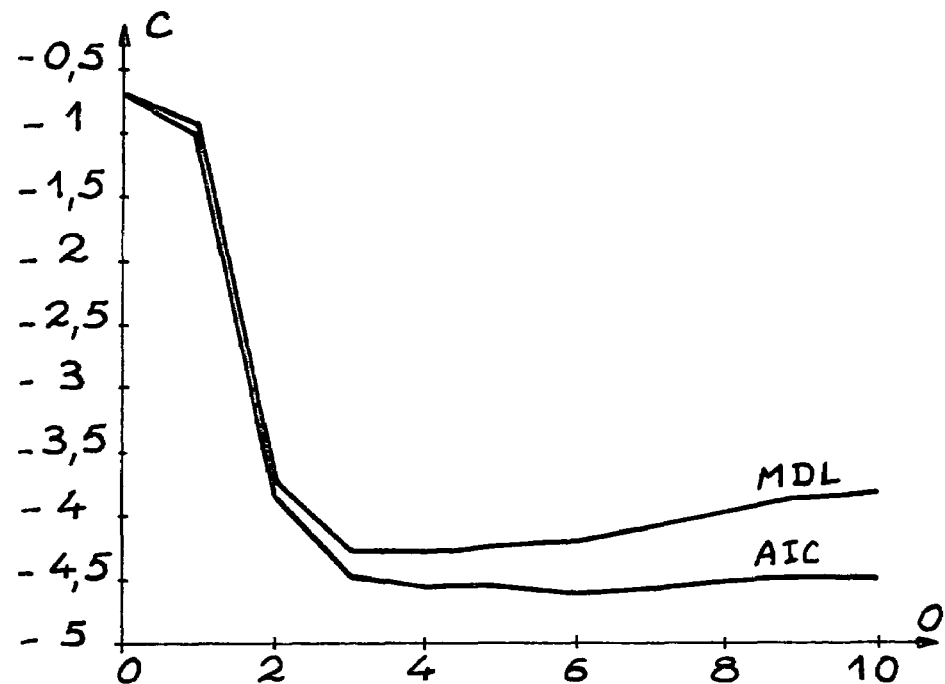

FIG. 7A shows an example of the variations of this quantity (carried as the y-axis) as a function of the order 0 (carried as the x-axis) for a sinusoidal component with a signal-to-noise ratio of 20 dBs with 128 samples taken into account. The order corresponding to the minimum is equal to 3. By way of example, FIG. 7B gives the variations in the quantities corresponding to the AIC and MDL criteria. It can be seen that the choice of order is more uncertain in that case.

D2. Estimation From a Law on Modules

A mode has a physical reality if the module of the associated pole is very close to unity, whereas the module of a mode associated with noise is set back in the circle of radius unity. It is therefore in principle possible to distinguish the poles by sorting the modules of the poles. The larger the signal-to-noise ratio the easier this distinction is to make. For a given ratio, the probability that a zero of the AR polynomial having a determined module in fact corresponds to a physical mode is a function of the value of this module. A general law of module distribution can be defined which makes it possible to assess, for a given value of the signal-to-noise ratio, a physical mode existence probability according to the value found for the module.

The applicant has found that the probability density law obeys a law of the type:

$$p(x) = \frac{x^{a-1}e^{-x/b}}{b^a\Gamma(a)} \qquad (13)$$

where a and b are two parameters and where $\Gamma(a)$ is the gamma function, x being positive. The probability is then expressed by the integral of this density taken between 0 and the value of the module, i.e.:

$$P[x \le x_0] = \int_0^{x_0} \frac{x^{a-1}e^{-x/b}}{b^a\Gamma(a)}dx \qquad (14)$$

Figure 8:
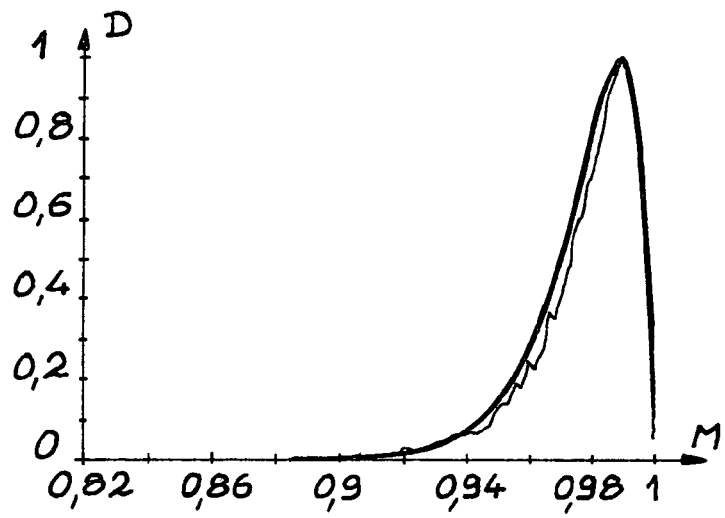
FIGS. 8A and 8B show two examples of gamma distribution.
Figure 8:
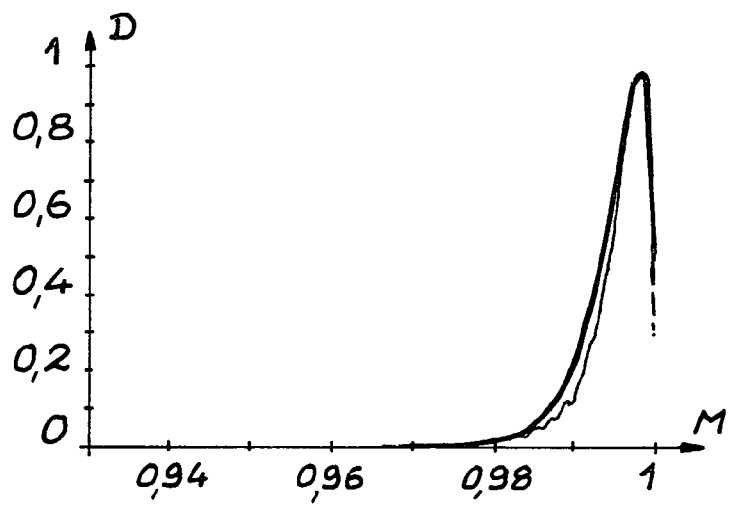

The curves in FIGS. 8A and 8B show the evolution of this density for a=1.9292 and b=0.0108 respectively with a signal-to-noise ratio of 20 dBs (FIG. 8A) and for a=1.5234 and b=0.0034, with a signal-to-noise ratio of 30 dBs (FIG. 8B). The y-axis gives the value of the probability density for any value of the module carried on the x-axis.

Figure 9:
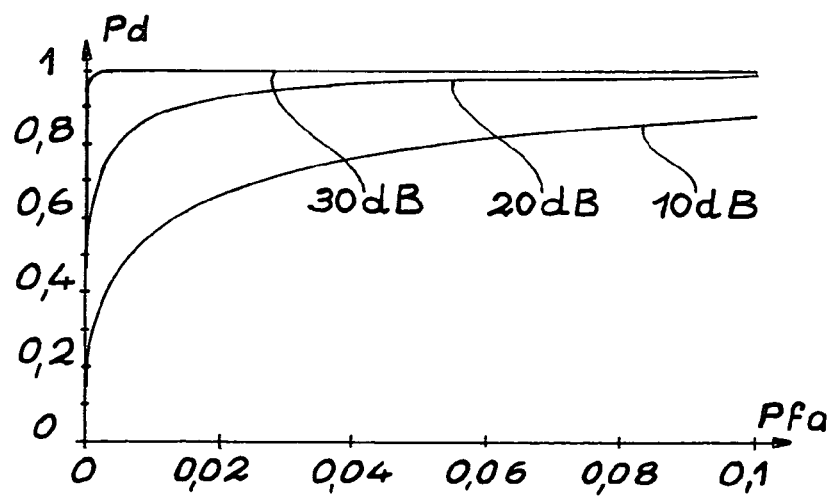
FIG. 9 shows the variations in detection probability as a function of the false alarm probability for three signal-to-noise ratios (10 dBs, 20 dBs, 30 dBs)

A false alarm probability (Pfa) can be defined as being the probability of considering that there exists a mode while the estimated module is below a certain threshold so. Accepting a certain error rate makes it possible to fix a false alarm probability and to deduce from it the mode detection probability. FIG. 9 thus gives the variations in this detection probability Pd as a function of the admitted false alarm probability Pfa, for different values of the signal-to-noise ratio expressed in dBs (10 dBs, 20 dBs and 30 dBs from bottom to top respectively). For example, for a Pfa of 1% (0.01 on the x-axis) and for a signal-to-noise ratio of 20 dBs, the theoretical detection probability is about 88% whereas experience gives about 85%. The concord between theory and practice is therefore satisfactory even if the model slightly overestimates the probability.

E) Calculating the Roots of the Model

The polynomial A(z) retained can be put into a form that better brings out its zeros:

$$A(z) = \prod_{(i=1)}^p (1 - z_i z^*) \qquad (15)$$

where the $z_i = P_i \exp(j2\pi f_i)$ are the p zeros. These solutions are combined in twos since the $a_k$ parameters are real for a physical process. The zeros $z_i$ can be calculated using the so-called Bairstow method. It is not necessary to calculate all the zeros. If processing time is short (a constraint related to real-time), some zeros may be enough.

Each zero has a module $\rho_i$ and a phase $2\pi f_i$. Each zero can therefore be represented by a point in the complex plane. The module $\rho_i$ of the pole $z_i$ measures the sharpness of the resonance: the closer it is to unity, the more marked the resonance and the higher the probability that it is a phenomenon with a physical reality. On the other hand, for a module $\rho_i$ well below unity corresponds either to a heavily cushioned physical mode, or to noise.

F) Calculation of Components and Follow-up

The phase $\theta_i$ of a root is related to the frequency $f_i$ of the corresponding mode by:

$$\theta_i = 2\pi f_i/f_e \qquad (16)$$

If you know the root phase, you then immediately have the frequency $f_i$:

$$f_i = \frac{\theta_i f_e}{2\pi} \qquad (17)$$

Each mode of frequency $f_i$ corresponds to a sinusoidal component of the form $V_i \sin(2\pi f_i t + \phi_i)$.

It remains to follow the evolution of the basic frequencies in time in order subsequently to estimate the amplitudes. Since each mode is defined by its frequency and its energy, it may be represented by a point in a space with three dimensions time-frequency-energy.

Figure 10:
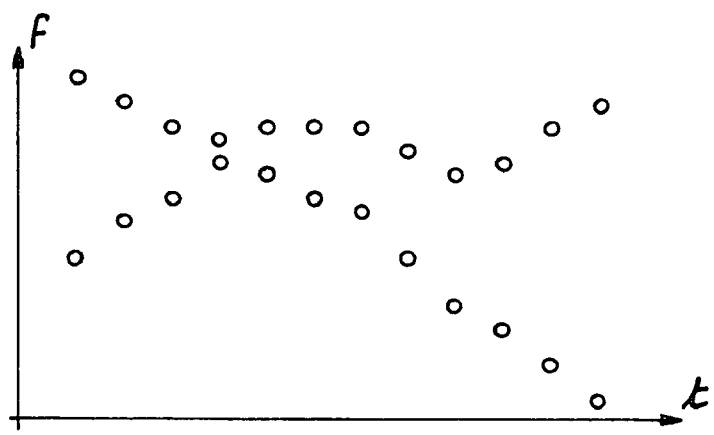
FIGS. 10A, 10B and 10C show the evolution of the modes in time and show the question of the monitoring of these modes.
Figure 10:
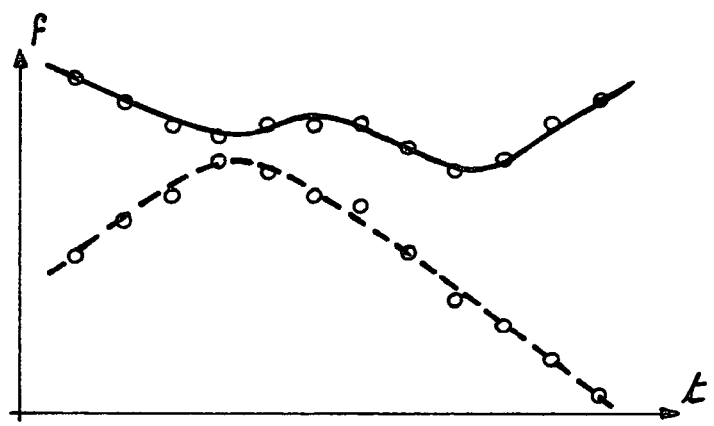
Figure 10:
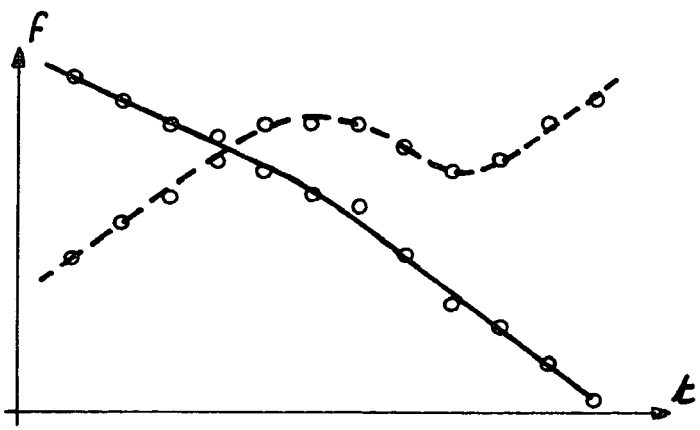

FIG. 10A thus shows the points representing two modes in a time-frequency plane (t,f). Each point corresponds to a sampling instant. It is clear that a difficulty of interpretation appears in the zone where the two modes meet:

Either it is considered that the upper mode becomes the lower mode (and vice versa) because its frequency does not stop decreasing (or growing) (FIG. 10B).

Or it is considered that the modes do not intersect and that the upper mode remains above the lower mode (FIG. 10C).

To resolve this, a function is calculated which reflects the link between each point and the previous points and an estimate is made at each instant, of what is the most probable link given the history of the mode. It is possible, for example, to calculate the square of the distance between a point obtained at a given instant and the points obtained at the previous instant and to consider that all the points minimising a weighted function of the squares corresponds to a same mode.

Weighting can be exponential with a forgetting factor which favours the latest points acquired.

To calculate the amplitudes, the $V_i$ are calculated such that the following sum of quadratic errors is minimal:

$$\left[\sum_i V_i \sin(2\pi \hat{f}_i + \varphi_i) - E_n\right]^2 \quad (18)$$

where $E_n$ is the value of the sample of the signal for analysis and $V_i \sin(2\pi \hat{f}_i + \phi_i)$ is the value of the sample of the sinusoidal component. To do this various known methods can be used (least squares, Kalman method, etc.).

As a variant, all the calculations are not remade at each sampling instant in the knowledge that the $A_i$ are known at the previous instant. It is sufficient to calculate the variations in the $A_i$ which retained the minimum of the quadratic sum of the errors.

At the end of this operation of monitoring and estimation of each of the amplitudes, one is therefore in possession of a set of parameters (in other words a "vector"), including the frequencies $f_i$, the modules $\rho_i$ and the amplitudes $V_i$ of the various components of the analysed signal. This treatment relates to a sub-band. The signal can therefore be analysed finally by gathering together the results obtained for the different sub-bands.

Figure 11:
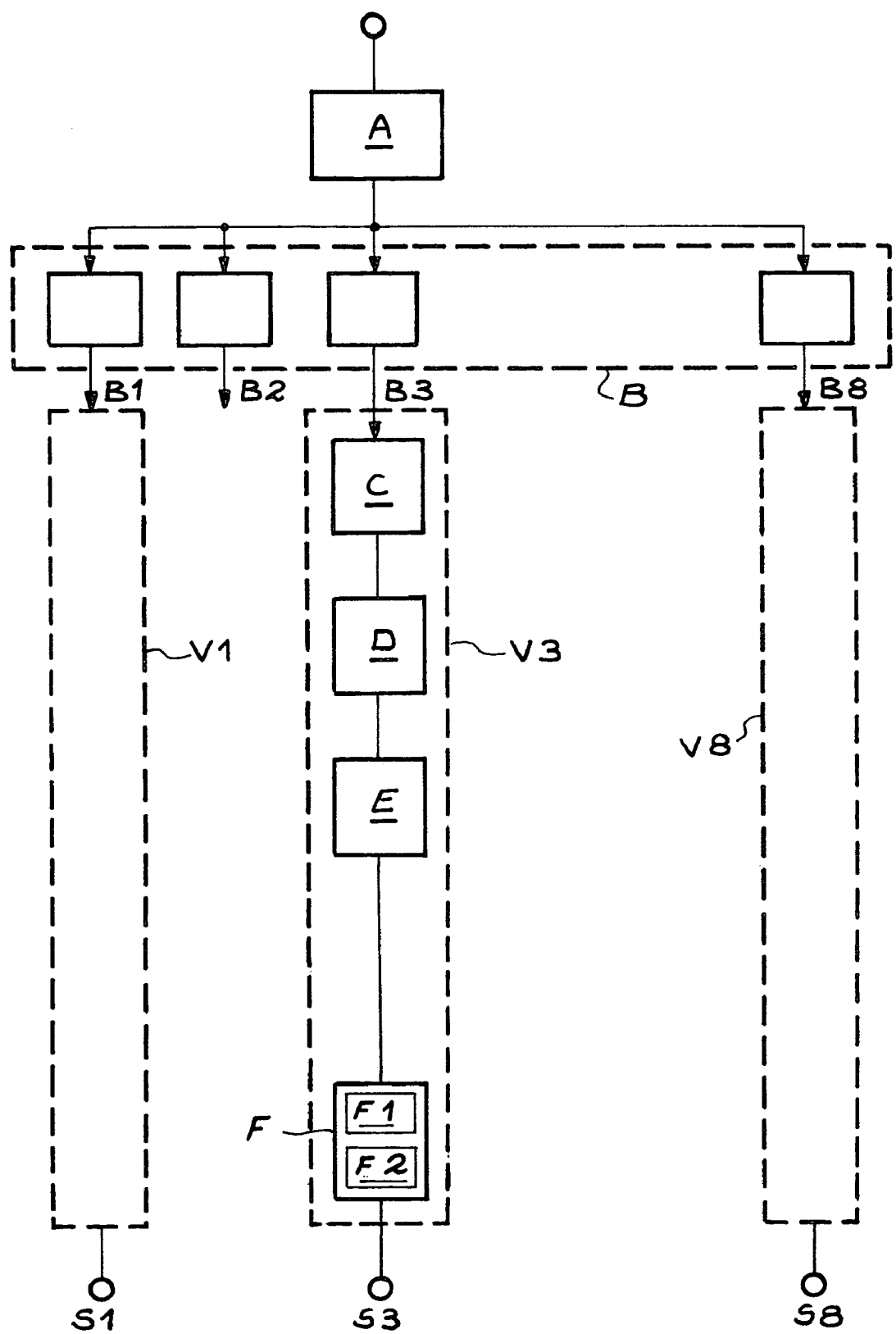
FIG. 11 shows a block diagram of an analysis circuit for implementing the process.

FIG. 11 shows a block diagram of an analysis circuit implementing the process which has just been described. The functional blocks of this circuit are given the letter references (A, B, C, to F) which correspond to the different operations (A, B, C, to F) of the process. The following can therefore be found in sequence:

A) a circuit A for sampling the signal at a frequency (fe) at least equal to twice the highest expected frequency and the samples obtained are digitised, B) a circuit B for breaking up the sampled and digitized signal into sub-bands including a bank of digital filters with adjacent pass bands; in FIG. 11 this circuit includes 8 digital filters corresponding to 8 sub-bands $B_1$, $B_2$, $B_3$, to $B_8$;

C) for each sub-band, (for example for the sub-band B3), a signal modelling means C, this means including an auto-regressive filter, the transfer function of which is 1/A(z), where A(z) is a polynomial of the complex variable z=exp(j2πf/fe), this means implementing an adaptive method recursive in time and in order, and to calculate all the polynomials A(z) with a degree between 1 and a maximum value selected in advance, D) a means D for estimating the model order and for retaining among all the polynomials calculated the one which possesses this order, E) a calculation circuit E implementing a recursive algorithm, able to calculate at least some complex roots of the selected polynomial, F) means F1, F2 for determining, from the phase of the roots obtained, the corresponding frequencies, and for monitoring the sinusoidal components, these means being able to calculate, in a frequency-amplitude plane, the square of the distance separating a current point corresponding to a component at one sampling instant from the points obtained at the previous sampling instant, to make the previous point which minimises this square correspond to the current point and to relate the different points by minimising a weighted function of these squares, these means being able, from the frequencies, to seek the amplitudes of the sinusoidal components having these frequencies and which minimise the quadratic error between the sum of these components and the signal for analysis.

All these means C, D, E, F, constitute a treatment path $V_1$, to $V_2$ to $V_8$, each giving the amplitude of the different sinusoidal components in the sub-band under consideration ($B_1$ to $B_8$). The outputs $S_1$ to $S_8$ of these paths can be subsequently combined to bring the results together.

The invention claimed is:

1. Method for analysing the frequency in real-time of a non-stationary signal, characterised in that said method includes the following operations:

A) the signal is sampled at a frequency (fe) at least equal to twice the highest expected frequency and the samples obtained are digitised, B) the sampled and digitised signal is broken up into sub-bands by applying the samples to a bank of digital filters with adjacent pass bands, C) the signal is modelled in each sub-band by an auto-regressive filter, the transfer function of which is 1/A (z), where A(z) is a polynomial of the complex variable z=exp(j2πf/fe) by implementing an adaptive method that is recursive in time and in order, all the polynomials A(z) with a degree between 1 and a maximum value selected in advance are calculated, D) the order of the model is estimated and of all the calculated polynomials the one retained is the one having said order, E) using a recursive algorithm, at least some complex roots of the polynomial selected are calculated, F) from the phase of the roots obtained, the corresponding frequencies are determined, and from the frequencies, the square of the distance separating a current point corresponding to a component at one sampling instant from the points obtained at the previous sampling instant, the previous point which minimises said square is made to correspond to the current point and the different points are connected by minimising a weighted function of said square and the amplitudes are sought for the sinusoidal components that have said frequencies and which minimise the quadratic error between the sum of said components and the signal for analysis, the sinusoidal components are monitored by calculating, in a frequency-amplitude plane.

2. Method according to claim 1, wherein, after the sampled and digitised signal is broken up into sub-bands, each sub-band is spread in frequency by decimation of the samples.

3. Method according to claim 1, wherein the signal is broken up into sub-bands by a bank of compact support (finite impulse response) orthogonal filters.

4. Method according to claim 1, wherein a cascade of filtering stages is used each possessing $2^k$ filters where k is the rank of the stage.

5. Method according to claim 1, wherein the signal is broken up into sub-bands by non-compact support (infinite impulse response) filters.

6. Method according to claim 5, wherein the filters are orthogonal.

7. Method according to claim 5, wherein non-orthogonal filters are used followed by Hilbert filters.

8. Method according to claim 1, wherein in the operation D, the model order is estimated from a criterion based on the maximum a posteriori (MAP) of the model existence probability.

9. Method according to claim 1, wherein, from knowledge of modules of the polynomial roots, the mode existence probability corresponding to said modules is evaluated relative to a probability distribution law selected in advance, and from the number of probable modes thus evaluated the order of the polynomial modelling the signal for analysis is deduced.

10. Method according to claim 9, wherein the distribution law is a two parameter gamma law.

11. Circuit for analysing the frequency in real-time of a non-stationary signal for implementing the method according to claim 1, characterised in that said circuit includes:
- A) a circuit for sampling the signal at a frequency (fe) at least equal to twice the highest expected frequency and the samples obtained are digitised,
- B) a circuit for breaking up the sampled and digitized signal into sub-bands including a bank of digital filters with adjacent pass bands,
- C) for each sub-band, a signal modelling means including an auto-regressive filter, the transfer function of which is $1/A(z)$, where $A(z)$ is a polynomial of the complex variable $z=\exp(j2\pi f/fe)$, said signal modelling means implementing an adaptive method recursive in time and in order, and being able to calculate all the polynomials $A(z)$ with a degree between 1 and a maximum value selected in advance,
- D) a means for estimating the model order and for retaining among all the polynomials calculated the one which possesses said order,
- E) a calculation circuit implementing a recursive algorithm, able to calculate at least some complex roots of the selected polynomial,
- F) means for determining, from the phase of the roots obtained, the corresponding frequencies, and for monitoring the sinusoidal components, said determining means being able to calculate, in a frequency-amplitude plane, the square of the distance separating a current point corresponding to a component at one sampling instant from the points obtained at the previous sampling instant, to make the previous point which minimises said square correspond to the current point and to relate the different points by minimising a weighted function of said square, said determining means being able, from the frequencies, to seek the amplitudes of the sinusoidal components having said frequencies and which minimise the quadratic error between the sum of said components and the signal for analysis.

* * * * *